Patented May 21, 1929.

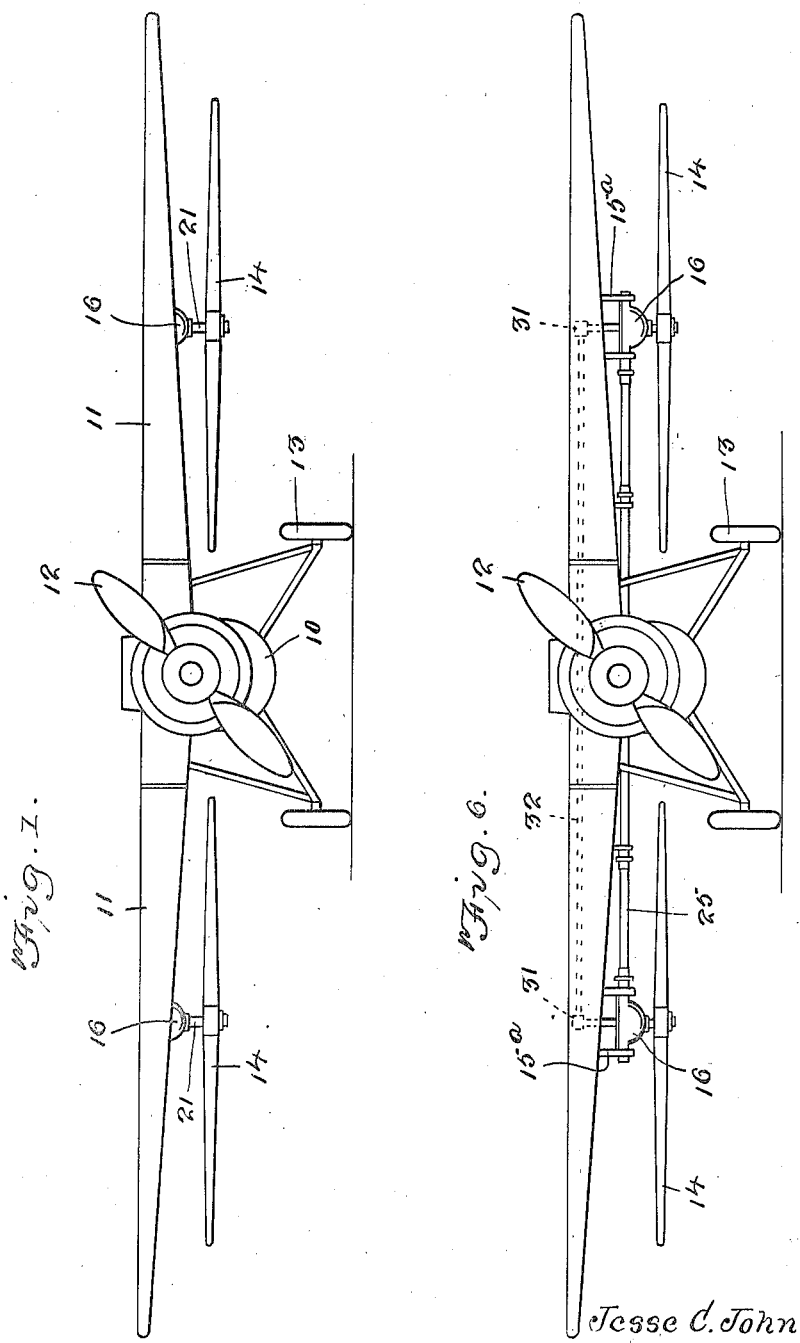

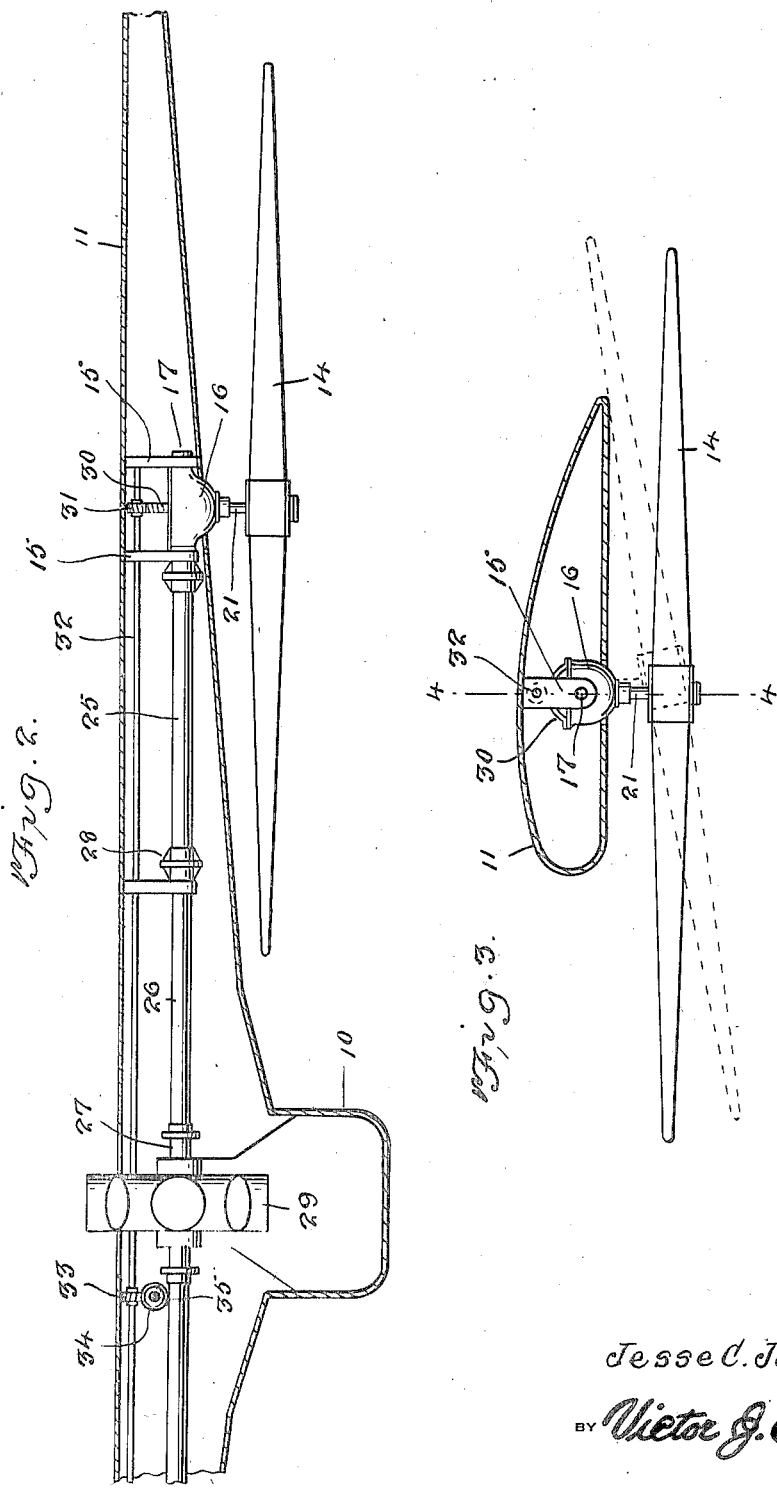

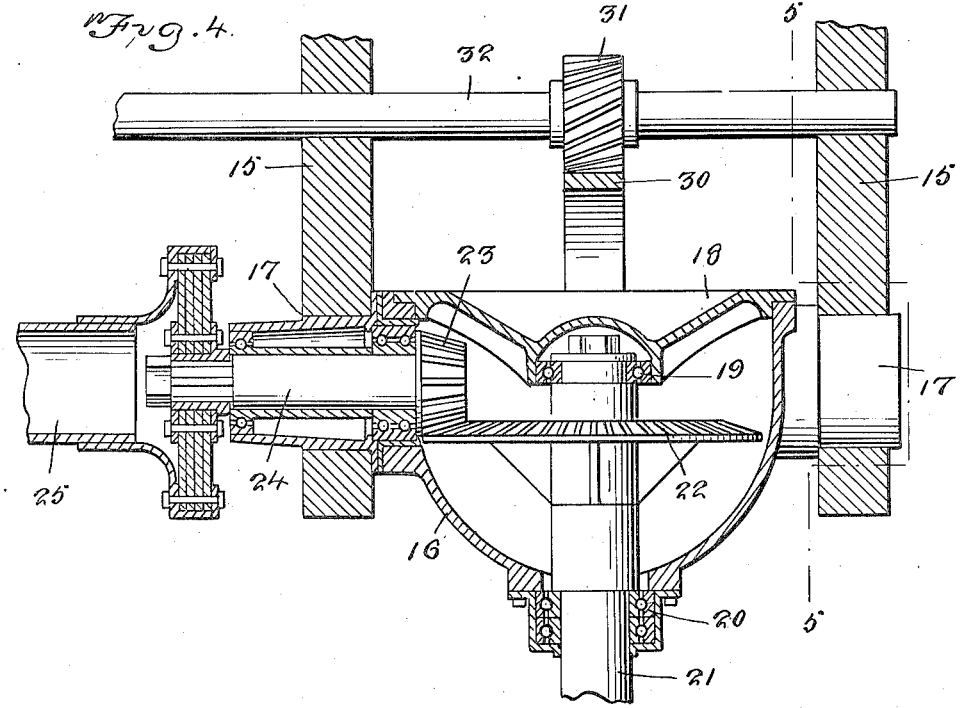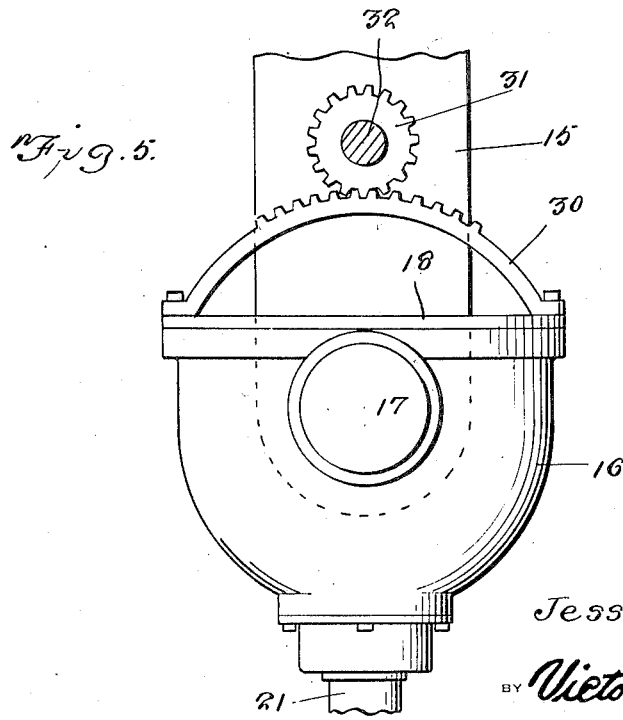

1,713,874

UNITED STATES PATENT OFFICE.

JESSE C. JOHNSON, OF DELRAY, FLORIDA, ASSIGNOR TO JOHNSON AEROPLANE CORPORATION, OF DELRAY, FLORIDA, A CORPORATION OF FLORIDA.

AIRPLANE.

Application filed January 27, 1928. Serial No. 249,940.

This invention relates to improvements in airplanes, and has for an object the provision of means for so mounting and operating a pair of lifting propellers or helicopters as to eliminate the tendency of the formation of a vacuum beneath the wings of the plane, and to create a partial vacuum above the wings in the helicopter type of plane, and thus increase the lifting effect and aid in the rise of the plane, the invention being especially useful upon monoplanes.

Another object of the invention is the provision of a propeller of large diameter and flat pitch which may be operated at a relatively slow speed and yet provide a proper lifting action without undue strain upon the driving mechanism which is present in high speed propellers.

Another object of the invention is the provision of novel means for mounting the propellers and the propeller driving means, so that the propellers may be adjusted with respect to the wings and used either as lifting or traction propellers, means being provided whereby the propellers may be rotatably adjusted about the centers of their driving shafts and thus resist tendency of the shafts to become disaligned.

Another object of the invention is the provision of means for housing the driving mechanism of the lifting propellers within the wings of the airplane to reduce flying friction.

With the above and other objects in view, the invention further includes the following novel features and details of construction, to be hereinafter more fully described, illustrated in the accompanying drawings and pointed out in the appended claims.

In the drawings:—

Figure 1 is a front view of a monoplane constructed in accordance with the invention.

Figure 2 is an enlarged vertical sectional view taken transversely through the fuselage of the airplane and showing the manner of mounting and driving the lifting propeller.

Figure 3 is a sectional view taken transversely of one of the wings.

Figure 4 is a section taken substantially on the line 4—4 of Figure 3.

Figure 5 is a view taken substantially on the line 5—5 of Figure 4.

Figure 6 is a front view showing a slightly different manner of mounting the propeller driving mechanism.

Referring to the drawings in detail wherein like characters of reference denote corresponding parts, the invention is shown in connection with a monoplane which includes a body or fuselage 10 and wings 11 which extend laterally from opposite sides of the fuselage. The plane is provided with a traction propeller 12 which is driven through the medium of an engine in the ordinary manner, and with landing gear 13.

In addition to the traction propeller 12, the plane is provided with propellers 14 which operate as lifting propellers or helicopters. One of these propellers is arranged beneath each of the wings 11 and is so disposed with respect to its wing as to force a current of air upward against the bottom of the wing when the propeller is rotated to lift the plane. This eliminates tendency of a vacuum to form upon the under side of the wing such as occurs where the lifting propeller is placed above the wing. Further, the air being forced upward around the side edges of the wing tends to create a vacuum on top of the wing and thus increase the lifting effect. The propellers 14 are of large diameter and flat pitch and are adapted to be rotated at slow speed in a direction toward one another, the diameter of the propeller and the formation of its blades permitting of this slow speed operation, yet providing a maximum amount of lifting power.

In order to support the propellers beneath the wings, the invention provides bearing members 15. These members may be housed within the wing as shown in Figure 2 of the drawings or they may be suspended below the wings as shown at 15ª in Figure 6. Located between these bearing members 15 is a housing 16 from which extends oppositely disposed trunnions 17, the latter having bearings in the bearing members 15. The housing 16 is substantially cup shaped and is provided with a cover 18, while mounted in bearings 19 and 20 provided in the cover and housing respectively, is a propeller shaft 21 upon the lower end of which is mounted one of the propellers 14.

Fast upon the shaft 21 within the housing 16 is a gear 22 and this gear is driven by a pinion 23 which is fast upon a drive shaft. This shaft includes separate sections 24, 25, 26 and 27 and these sections are connected by suitable coupling devices or universal joints 28, an engine 29 being provided to operate the shafts. As the sectional drive shafts for the propellers 14 are arranged concentric with the trunnions 17 and as these trunnions are mounted for rotation in the bearing members 15, the housings 16 may be rotated around or concentric with the axis of the drive shafts so as to prevent disalignment of the shafts when the propellers 14 are adjusted in a manner to be explained.

In addition to the use of the propellers 14 as lifting propellers, these propellers may also to be utilized as traction propellers to assist the traction propeller 12. To provide for this, the housings 16 which support the bearings 19 and 20 for the shafts 21 are swingingly or rotatably mounted upon the trunnions 17 and these housings may be swingingly or rotatably adjusted to position the propellers for rotation in a plane substantially parallel with the wings as shown in the full line position in Figure 3 of the drawings, or at an angle with respect to the wings as shown by the dotted line position in said figure. This adjustment is accomplished by providing each of the housings 16 with an arcuate rack 30 whose teeth are engaged by a pinion 31, one of which is mounted at opposite ends of a shaft 32. This shaft also has bearings in the bearing member 15 and has secured thereon a worm gear 33 which meshes with a similar gear 34 mounted upon a shaft 35. This shaft extends into the fuselage of the airplane to within convenient reach of the aviator and may be provided with suitable means (not shown) whereby it may be manually rotated to vary the position of the propellers 14.

By housing the operating mechanism of the propellers 14 within the wings 11, flying friction is materially reduced, although, if desired the mechanism may be arranged as shown in Figure 6 of the drawings.

It may be also stated that while the invention is illustrated in connection with a monoplane, it is not the purpose of the present application to limit the invention to this particular type of plane.

The invention is susceptible of various changes in its form, proportions and minor details of construction and the right is herein reserved to make such changes as properly fall within the scope of the appended claims.

Having described the invention what is claimed is:—

1. In an airplane, a fuselage, a traction propeller at one end thereof, wings extending laterally upon opposite sides of the fuselage, a relatively large diameter flat pitch propeller carried by and arranged beneath each wing, said propeller having a diameter greater than the width of the wing and adapted for relatively slow rotation to direct a current of air upon the under side of and around the forward and rear edges of the wings to prevent the formation of a vacuum beneath and increase the vacuum above said wings, and means to operate the propellers.

2. In an airplane, a fuselage, a traction propeller at one end thereof, wings extending laterally upon each side of the fuselage, a propeller located beneath each wing and adapted to direct a current of air upon the under side of the wing, means to support the propellers for operation, driving means housed within the wings and operatively connected with the propellers to rotate the latter, and means to operate the driving means.

3. In an airplane, a fuselage, a traction propeller at one end thereof, wings extending laterally upon opposite sides of the fuselage, a propeller located beneath each wing and adapted to direct a current of air upon the under side of the wings, spaced bearing members carried by the wings, a gear housing, trunnions carried by the housing and extending into the bearing members, a propeller shaft carried by the gear housing to support the propeller, a motor, drive shafts operated by the motor and extending longitudinally of the wings into the housings, gearing connecting the drive shafts and propeller shafts, and means to adjust the housings pivotally to adjust the lifting propellers relative to the wings.

4. In an airplane, a fuselage, a traction propeller at one end thereof, wings extending laterally upon opposite sides of the fuselage, a propeller located beneath each wing and adapted to direct a current of air upon the under side of the wings, spaced bearing members carried by the wings, a gear housing, trunnions carried by the housing and extending into the bearing members, a propeller shaft carried by the gear housing to support the propeller, a motor, drive shafts operated by the motor and extending longitudinally of the wings into the housings, gearing connecting the drive shafts and propeller shafts, segmental racks secured to the housings, and a shaft extending longitudinally of the wings and having gears thereon engaging the racks and adapted to be rotated to adjust the housings pivotally and adjust the lifting propellers relative to the wing.

In testimony whereof I affix my signature.

JESSE C. JOHNSON.